(12) United States Patent
Grichnik et al.

(10) Patent No.: US 7,877,239 B2
(45) Date of Patent: Jan. 25, 2011

(54) SYMMETRIC RANDOM SCATTER PROCESS FOR PROBABILISTIC MODELING SYSTEM FOR PRODUCT DESIGN

(75) Inventors: Anthony J. Grichnik, Peoria, IL (US); Michael Seskin, Cardiff, CA (US)

(73) Assignee: Caterpillar Inc, Peoria, IL (US)

( * ) Notice: Subject to any disclaimer, the term of this patent is extended or adjusted under 35 U.S.C. 154(b) by 654 days.

(21) Appl. No.: 11/477,515

(22) Filed: Jun. 30, 2006

(65) Prior Publication Data

US 2010/0250202 A1 Sep. 30, 2010

Related U.S. Application Data

(63) Continuation-in-part of application No. 11/101,498, filed on Apr. 8, 2005, now abandoned.

(51) Int. Cl.
*G06F 17/10* (2006.01)
(52) U.S. Cl. .......................................................... 703/2
(58) Field of Classification Search ...................... 703/2
See application file for complete search history.

(56) References Cited

U.S. PATENT DOCUMENTS

| | | | |
|---|---|---|---|
| 3,316,395 A | 4/1967 | Lavin | |
| 4,136,329 A | 1/1979 | Trobert | |
| 4,533,900 A | 8/1985 | Muhlberger et al. | |
| 5,014,220 A | 5/1991 | McMann et al. | |
| 5,163,412 A | 11/1992 | Neu et al. | |
| 5,262,941 A | 11/1993 | Saladin et al. | |
| 5,341,315 A | 8/1994 | Niwa et al. | |
| 5,386,373 A | 1/1995 | Keeler et al. | |
| 5,434,796 A | 7/1995 | Weininger | |
| 5,539,638 A | 7/1996 | Keeler et al. | |
| 5,548,528 A | 8/1996 | Keeler et al. | |
| 5,561,610 A | 10/1996 | Schricker et al. | |
| 5,566,091 A | 10/1996 | Schricker et al. | |
| 5,585,553 A | 12/1996 | Schricker | |
| 5,594,637 A | 1/1997 | Eisenberg et al. | |
| 5,598,076 A | 1/1997 | Neubauer et al. | |

(Continued)

FOREIGN PATENT DOCUMENTS

EP 1103926 5/2001

(Continued)

OTHER PUBLICATIONS

Allen et al., "Supersaturated Designs That Maximize the Probability of Identifying Active Factors," 2003 American Statistical Association and the American Society for Quality, Technometrics, vol. 45, No. 1, Feb. 2003, pp. 1-8.

(Continued)

*Primary Examiner*—Hugh Jones
(74) *Attorney, Agent, or Firm*—Finnegan, Henderson, Farabow, Garrett & Dunner LLC (57) ABSTRACT

A method is provided for designing a product. The method may include obtaining data records relating to one or more input variables and one or more output parameters associated with the product and selecting one or more input parameters from the one or more input variables. The method may also include generating a computational model indicative of inter-relationships between the one or more input parameters and the one or more output parameters based on the data records and providing a set of constraints to the computational model representative of a compliance state for the product. Further the method may include using the computational model and the provided set of constraints to generate statistical distributions for the one or more input parameters based on a symmetric random scatter process and the one or more output parameters. The one or more input parameters and the one or more output parameters represent a design for the product.

20 Claims, 3 Drawing Sheets

U.S. PATENT DOCUMENTS

| | | | |
|---|---|---|---|
| 5,604,306 A | 2/1997 | Schricker |
| 5,604,895 A | 2/1997 | Raimi |
| 5,608,865 A | 3/1997 | Midgely et al. |
| 5,666,297 A | 9/1997 | Britt et al. |
| 5,682,317 A | 10/1997 | Keeler et al. |
| 5,698,780 A | 12/1997 | Mizutani et al. |
| 5,727,128 A | 3/1998 | Morrison |
| 5,750,887 A | 5/1998 | Schricker |
| 5,752,007 A | 5/1998 | Morrison |
| 5,835,902 A | 11/1998 | Jannarone |
| 5,842,202 A | 11/1998 | Kon |
| 5,914,890 A | 6/1999 | Sarangapani et al. |
| 5,925,089 A | 7/1999 | Fujime |
| 5,950,147 A | 9/1999 | Sarangapani et al. |
| 5,966,312 A | 10/1999 | Chen |
| 5,987,976 A | 11/1999 | Sarangapani |
| 6,092,016 A | 7/2000 | Sarangapani et al. |
| 6,119,074 A | 9/2000 | Sarangapani |
| 6,145,066 A | 11/2000 | Atkin |
| 6,195,648 B1 | 2/2001 | Simon et al. |
| 6,199,007 B1 | 3/2001 | Zavarehi et al. |
| 6,208,982 B1 | 3/2001 | Allen, Jr. et al. |
| 6,223,133 B1 | 4/2001 | Brown |
| 6,236,908 B1 | 5/2001 | Cheng et al. |
| 6,240,343 B1 | 5/2001 | Sarangapani et al. |
| 6,269,351 B1 | 7/2001 | Black |
| 6,298,718 B1 | 10/2001 | Wang |
| 6,370,544 B1 | 4/2002 | Krebs et al. |
| 6,405,122 B1 | 6/2002 | Yamaguchi |
| 6,438,430 B1 | 8/2002 | Martin et al. |
| 6,442,511 B1 | 8/2002 | Sarangapani et al. |
| 6,477,660 B1 | 11/2002 | Sohner |
| 6,513,018 B1 | 1/2003 | Culhane |
| 6,546,379 B1 | 4/2003 | Hong et al. |
| 6,584,768 B1 | 7/2003 | Hecker et al. |
| 6,594,989 B1 | 7/2003 | Hepburn et al. |
| 6,698,203 B2 | 3/2004 | Wang |
| 6,711,676 B1 | 3/2004 | Zomaya et al. |
| 6,721,606 B1 | 4/2004 | Kaji et al. |
| 6,725,208 B1 | 4/2004 | Hartman et al. |
| 6,763,708 B2 | 7/2004 | Ting et al. |
| 6,775,647 B1 | 8/2004 | Evans et al. |
| 6,785,604 B2 | 8/2004 | Jacobson |
| 6,810,442 B1 | 10/2004 | Lin et al. |
| 6,823,675 B2 | 11/2004 | Brunell et al. |
| 6,859,770 B2 | 2/2005 | Ramsey |
| 6,859,785 B2 | 2/2005 | Case |
| 6,865,883 B2 | 3/2005 | Gomulka |
| 6,882,929 B2 | 4/2005 | Liang et al. |
| 6,895,286 B2 | 5/2005 | Kaji et al. |
| 6,935,313 B2 | 8/2005 | Jacobson |
| 6,941,287 B1 | 9/2005 | Vaidyanathan et al. |
| 6,952,662 B2 | 10/2005 | Wegerich et al. |
| 6,976,062 B1 | 12/2005 | Denby et al. |
| 7,000,229 B2 | 2/2006 | Gere |
| 7,024,343 B2 | 4/2006 | El-Ratal |
| 7,027,953 B2 | 4/2006 | Klein |
| 7,035,834 B2 | 4/2006 | Jacobson |
| 7,117,079 B2 | 10/2006 | Streichsbier et al. |
| 7,124,047 B2 | 10/2006 | Zhang et al. |
| 7,127,892 B2 | 10/2006 | Akins et al. |
| 7,174,284 B2 | 2/2007 | Dolansky et al. |
| 7,178,328 B2 | 2/2007 | Solbrig |
| 7,191,161 B1 | 3/2007 | Rai et al. |
| 7,194,392 B2 | 3/2007 | Tuken et al. |
| 7,213,007 B2 | 5/2007 | Grichnik |
| 7,356,393 B1 | 4/2008 | Schlatre et al. |
| 7,369,925 B2 | 5/2008 | Morioka et al. |
| 2002/0014294 A1 | 2/2002 | Okano et al. |
| 2002/0016701 A1 | 2/2002 | Duret et al. |
| 2002/0042784 A1 | 4/2002 | Kerven et al. |
| 2002/0049704 A1 | 4/2002 | Vanderveldt et al. |
| 2002/0103996 A1 | 8/2002 | LeVasseur et al. |
| 2002/0198821 A1 | 12/2002 | Munoz |
| 2003/0018503 A1 | 1/2003 | Shulman |
| 2003/0055607 A1 | 3/2003 | Wegerich et al. |
| 2003/0093250 A1 | 5/2003 | Goebel |
| 2003/0126053 A1 | 7/2003 | Boswell et al. |
| 2003/0126103 A1 | 7/2003 | Chen et al. |
| 2003/0130855 A1 | 7/2003 | Babu et al. |
| 2003/0167354 A1 | 9/2003 | Peppers et al. |
| 2003/0187567 A1 | 10/2003 | Sulatisky et al. |
| 2003/0187584 A1 | 10/2003 | Harris |
| 2003/0200296 A1 | 10/2003 | Lindsey |
| 2004/0030420 A1 | 2/2004 | Ulyanov et al. |
| 2004/0034857 A1 | 2/2004 | Mangino et al. |
| 2004/0059518 A1 | 3/2004 | Rothschild |
| 2004/0077966 A1 | 4/2004 | Yamaguchi et al. |
| 2004/0122702 A1 | 6/2004 | Sabol et al. |
| 2004/0122703 A1 | 6/2004 | Walker et al. |
| 2004/0128058 A1 | 7/2004 | Andres et al. |
| 2004/0135677 A1 | 7/2004 | Asam |
| 2004/0138995 A1 | 7/2004 | Hershkowitz et al. |
| 2004/0153227 A1 | 8/2004 | Hagiwara et al. |
| 2004/0230404 A1 | 11/2004 | Messmer et al. |
| 2004/0267818 A1 | 12/2004 | Hartenstine |
| 2005/0047661 A1 | 3/2005 | Mauer |
| 2005/0055176 A1 | 3/2005 | Clarke et al. |
| 2005/0091093 A1 | 4/2005 | Bhaskaran et al. |
| 2005/0209943 A1 | 9/2005 | Ballow et al. |
| 2005/0210337 A1 | 9/2005 | Chester et al. |
| 2005/0240539 A1 | 10/2005 | Olavson |
| 2005/0261791 A1 | 11/2005 | Chen et al. |
| 2005/0262031 A1 | 11/2005 | Saidi et al. |
| 2005/0278227 A1 | 12/2005 | Esary et al. |
| 2005/0278432 A1 | 12/2005 | Feinleib et al. |
| 2006/0010057 A1 | 1/2006 | Bradway et al. |
| 2006/0010142 A1 | 1/2006 | Kim et al. |
| 2006/0010157 A1 | 1/2006 | Dumitrascu et al. |
| 2006/0025897 A1 | 2/2006 | Shostak et al. |
| 2006/0026270 A1 | 2/2006 | Sadovsky et al. |
| 2006/0026587 A1 | 2/2006 | Lemarroy et al. |
| 2006/0064474 A1 | 3/2006 | Feinleib et al. |
| 2006/0068973 A1 | 3/2006 | Kappauf et al. |
| 2006/0129289 A1 | 6/2006 | Kumar et al. |
| 2006/0130052 A1 | 6/2006 | Allen et al. |
| 2006/0229753 A1 | 10/2006 | Seskin et al. |
| 2006/0229769 A1 | 10/2006 | Grichnik et al. |
| 2006/0229852 A1 | 10/2006 | Grichnik et al. |
| 2006/0229854 A1 | 10/2006 | Grichnik et al. |
| 2006/0230018 A1 | 10/2006 | Grichnik et al. |
| 2006/0230097 A1 | 10/2006 | Grichnik et al. |
| 2006/0230313 A1 | 10/2006 | Grichnik et al. |
| 2006/0241923 A1 | 10/2006 | Xu et al. |
| 2006/0247798 A1 | 11/2006 | Subbu et al. |
| 2007/0061144 A1 | 3/2007 | Grichnik et al. |
| 2007/0094048 A1 | 4/2007 | Grichnik |
| 2007/0094181 A1 | 4/2007 | Tayebnejad et al. |
| 2007/0118338 A1 | 5/2007 | Grichnik et al. |
| 2007/0124237 A1 | 5/2007 | Sundararajan et al. |
| 2007/0150332 A1 | 6/2007 | Grichnik et al. |
| 2007/0168494 A1 | 7/2007 | Liu et al. |
| 2007/0179769 A1 | 8/2007 | Grichnik et al. |
| 2007/0203864 A1 | 8/2007 | Grichnik |
| 2008/0154811 A1 | 6/2008 | Grichnik et al. |
| 2009/0024367 A1* | 1/2009 | Grichnik et al. ............... 703/2 |

FOREIGN PATENT DOCUMENTS

| | | |
|---|---|---|
| EP | 1367248 | 12/2003 |
| EP | 1418481 | 5/2004 |
| JP | 10-332621 | 12/1998 |
| JP | 11-351045 | 12/1999 |
| JP | 2002-276344 | 9/2002 |

| | | |
|---|---|---|
| WO | WO 97/42581 | 11/1997 |
| WO | WO 02/057856 | 7/2002 |
| WO | WO 2006/017453 | 2/2006 |

OTHER PUBLICATIONS

April, Jay et al., "Practical Introduction to Simulation Optimization," Proceedings of the 2003 Winter Simulation Conference, pp. 71-78.
Bandte et al., "Viable Designs Through a Joint Probabilistic Estimation Technique," SAE International, and the American Institute of Aeronautics and Astronautics, Inc., Paper No. 1999-01-5623, 1999, pp. 1-11.
Beisl et al., "Use of Genetic Algorithm to Identify the Source Point of Seepage Slick Clusters Interpreted from Radarsat-1 Images in the Gulf of Mexico," Geoscience and Remote Sensing Symposium, 2004, Proceedings, 2004 IEEE International Anchorage, AK, Sep. 20-24, 2004, vol. 6, Sep. 20, 2004, pp. 4139-4142.
Berke et al., "Optimum Design of Aerospace Structural Components Using Neural Networks," Computers and Structures, vol. 48, No. 6, Sep. 17, 1993, pp. 1001-1010.
Bezdek, "Genetic Algorithm Guided Clustering," IEEE 0-7803-1899-4/94, 1994, pp. 34-39.
Brahma et al., "Optimization of Diesel Engine Operating Parameters Using Neural Networks," SAE Technical Paper Series, 2003-01-3228, Oct. 27-30, 2003 (11 pages).
Chau et al., "Use of runs test to access cardiovascular autonomic function in diabetic subjects," Abstract, Diabetes Care, vol. 17, Issue 2, pp. 146-148, available at http://care.diabetesjournals.org/cgi/content/abstract/17/2/146).
Chung et al., "Process Optimal Design in Forging by Genetic Algorithm," Journal of Manufacturing Science and Engineering, vol. 124, May 2002, pp. 397-408.
Cox et al., "Statistical Modeling for Efficient Parametric Yield Estimation of MOS VLSI Circuits," IEEE, 1983, pp. 242-245.
De Maesschalck et al., "The Mahalanobis Distance," Chemometrics and Intelligent Laboratory Systems, vol. 50, No. 1, Jan. 2000, pp. 1-18.
Dikmen et al., "Estimating Distributions in Genetic Algorithms," ISCIS 2003, LNCS 2869, 2003, pp. 521-528.
Galperin, G., et al., "Parallel Monte-Carlo Simulation of Neural Network Controllers," available at http://www-fp.mcs.anl.gov/ccst/research/reports_pre1998/neural_network/galperin.html, printed Mar. 11, 2005 (6 pages).
Gletsos et al., "A Computer-Aided Diagnostic System to Characterize CT Focal Liver Lesions: Design and Optimization of a Neural Network Classifier," IEEE Transactions on InformationTechnology in Biomedicine, vol. 7, No. 3, Sep. 2003 pp. 153-162.
Grichnik et al., "An Improved Metric for Robust Engineering," Proceedings of the 2007 International Conference on Scientific Computing, Las Vegas, NV (4 pages).
Grichnik et al., Copending U.S. Appl. No. 11/529,267, filed Sep. 29, 2006, entitled Virtual Sensor Based Engine Control System and Method.
Grichnik et al., Copending U.S. Appl. No. 11/730,363, filed Mar. 30, 2007, entitled Prediction Based Engine Control System and Method.
Grichnik et al., Copending U.S. Appl. No. 11/812,164, filed Jun. 15, 2007, entitled Virtual Sensor System and Method.
Grichnik et al., Copending U.S. Appl. No. 11/979,408, filed Nov. 2, 2007, entitled Virtual Sensor Network (VSN) System and Method.
Holland, John H., "Genetic Algorithms," Scientific American, Jul. 1992, pp. 66-72.
Hughes et al., "Linear Statistics for Zeros of Riemann's Zeta Function," C.R. Acad. Sci. Paris, Ser. I335 (2002), pp. 667-670.
Ko et al., "Application of Artificial Neural Network and Taguchi Method to Perform Design in Metal Forming Considering Workability," International Journal of Machine Tools & Manufacture, vol. 39, No. 5, May 1999, pp. 771-785.
Kroha et al., "Object Server on a Parallel Computer," 1997 IEEE 0-8186-8147-0/97, pp. 284-288.
Mavris et al., "A Probabilistic Approach to Multivariate Constrained Robust Design Simulation," Society of Automotive Engineers, Inc., Paper No. 975508, 1997, pp. 1-11.
National Institute of Health, "10-year CVD Risk Calculator" available at http://hin.nhlbi.nih.gov/atpiii/calculator.asp?usertype=prof, printed Aug. 2, 2005, 2 pages.
Obayashi et al, "Multiobjective Evolutionary Computation for Supersonic Wing-Shape Optimization," IEEE Transactions on Evolutionary Computation, vol. 4, No. 2, Jul. 2000, pp. 182-187.
Simpson et al., "Metamodels for Computer-Based Engineering Design: Survey & Recommendations," Engineering with Computers, 2001, vol. 17, pp. 129-150.
Song et al., "The Hyperellipsoidal Clustering Using Genetic Algorithm," 1997 IEEE International Conference on Intelligent Processing Systems, Oct. 28-31, 1997, Beijing, China, pp. 592-596.
Sytsma, Sid, "Quality and Statistical Process Control," available at http://www.sytsma.com/tqmtools/ctlchtprinciples.html, printed Apr. 7, 2005, 6 pages.
Taguchi et al., "The Mahalanobis-Taguchi Strategy," A Pattern Technology System, John Wiley & Sons, Inc., 2002, 234 pages.
Taylor et al., "Guidelines for Evaluating and Expressing the Uncertainty of NIST Measurement Results," NIST Technical Note 1297, 1994 Edition, United States Dept. of Commerce, National Institute of Standards and Technology (25 pages).
Thompson, G.J. et al., "Neural Network Modelling of the Emissions and Performance of a Heavy-Duty Diesel Engine," Proc. Instu. Mech. Engrs., vol. 214, Part D (2000), pp. 111-126.
Traver, Michael L. et al., "A Neural Network-Based Virtual NOx Sensor for Diesel Engines," West Virginia University, Mechanical and Aerospace Engineering Dept., Morgantown, WV 26506-6101, 6106, 7 pages.
Traver, Michael L. et al., "Neural Network-Based Diesel Engine Emissions Prediction Using In-Cylinder Combustion Pressure," International Spring Fuels & Lubricants Meeting & Exposition, SAE Technical Paper Series, May 3-6, 1999, 17 pages.
Woodall, Tsui et al., "A Review and Analysis of the Mahalanobis-Taguchi System," Technometrics, Feb. 2003, vol. 45, No. 1 (15 pages).
Wu et al., "Cam-phasing Optimization Using Artificial Neural Networks as Surrogate Models—Fuel Consumption and Nox Emissions," SAE Technical Paper Series, 2006-01-1512, Apr. 3-6, 2006 (19 pages).
Yang et al., "Similar Cases Retrieval from the Database of Laboratory Test Results," Journal of Medical Systems, vol. 27, No. 3, Jun. 2003, pp. 271-282.
Yuan et al., "Evolutionary Fuzzy C-Means Clustering Algorithm," 1995 IEEE 0-7803-2461-7/95, pp. 2221-2226.
Grichnik et al., "An Improved Metric for Robust Engineering," Proceedings of the 2007 International Conference on Scientific Computing, Las Vega, NV (4 pages).
Grichnik, "An Improved Metric for Robust Engineering for WORLDCOMP2007," PowerPoint Presentation, Jun. 18, 2007.

* cited by examiner

SYMMETRIC RANDOM SCATTER PROCESS FOR PROBABILISTIC MODELING SYSTEM FOR PRODUCT DESIGN

CROSS REFERENCE TO RELATED APPLICATIONS

This application is a continuation-in-part application of U.S. patent application Ser. No. 11/101,498, filed on Apr. 8, 2005, now abandoned, the benefit of priority from which is herein claimed.

TECHNICAL FIELD

This disclosure relates generally to product design systems and, more particularly, to probabilistic design based modeling systems for use in product design applications with symmetric random scatter processing techniques.

BACKGROUND

Many computer-based applications exist for aiding in the design of products. Using these applications, an engineer can construct a computer model of a particular product and can analyze the behavior of the product through various analysis techniques. Further, certain analytical tools have been developed that enable engineers to evaluate and test multiple design configurations of a product. While these analytical tools may include internal optimization algorithms to provide this functionality, these tools generally represent only domain specific designs. Therefore, while product design variations can be tested and subsequently optimized, these design variations are typically optimized with respect to only a single requirement within a specific domain.

Finite element analysis (FEA) applications may fall into this domain specific category. With FEA applications, an engineer can test various product designs against requirements relating to stress and strain, vibration response, modal frequencies, and stability. Because the optimizing algorithms included in these FEA applications can optimize design parameters only with respect to a single requirement, however, multiple design requirements must be transformed into a single function for optimization. For example, in FEA analysis, one objective may be to parameterize a product design such that stress and strain are minimized. Because the FEA software cannot optimize both stress and strain simultaneously, the stress and strain design requirements may be transformed into a ratio of stress to strain (i.e., the modulus of elasticity). In the analysis, this ratio becomes the goal function to be optimized.

Several drawbacks result from this approach. For example, because more than one output requirement is transformed into a single goal function, the underlying relationships and interactions between the design parameters and the response of the product system are hidden from the design engineer. Further, based on this approach, engineers may be unable to optimize their designs according to competing requirements.

Thus, there is a need for modeling and analysis applications that can establish heuristic models between design inputs and outputs, subject to defined constraints, and optimize the inputs such that the probability of compliance of multiple competing outputs is maximized. There is also a need for applications that can explain the causal relationship between design inputs and outputs. Further, there is a need for applications that can collect desired patterns of design inputs to reduce computational load required by the optimization.

Certain applications have been developed that attempt to optimize design inputs based on multiple competing outputs. For example, U.S. Pat. No. 6,086,617 ("the '617 patent") issued to Waldon et al. on Jul. 11, 2000, describes an optimization design system that includes a directed heuristic search (DHS). The DHS directs a design optimization process that implements a user's selections and directions. The DHS also directs the order and directions in which the search for an optimal design is conducted and how the search sequences through potential design solutions.

While the optimization design system of the '617 patent may provide a multi-disciplinary solution for product design optimization, this system has several shortcomings. The efficiency of this system is hindered by the need to pass through slow simulation tools in order to generate each new model result. Further, there is no knowledge in the system model of how variation in the input parameters relates to variation in the output parameters. The system of the '617 patent provides only single point solutions, which may be inadequate especially where a single point optimum may be unstable when subject to variability introduced by a manufacturing process or other sources. Further, the system of the '617 patent is limited in the number of dimensions that can be simultaneously optimized and searched.

Methods and systems consistent with certain features of the disclosed systems are directed to solving one or more of the problems set forth above.

SUMMARY OF THE INVENTION

One aspect of the present disclosure includes a method for designing a product. The method may include obtaining data records relating to one or more input variables and one or more output parameters associated with the product and selecting one or more input parameters from the one or more input variables. The method may also include generating a computational model indicative of interrelationships between the one or more input parameters and the one or more output parameters based on the data records and providing a set of constraints to the computational model representative of a compliance state for the product. Further the method may include using the computational model and the provided set of constraints to generate statistical distributions for the one or more input parameters based on a symmetric random scatter process and the one or more output parameters. The one or more input parameters and the one or more output parameters may represent a design for the product.

Another aspect of the present disclosure includes a computer readable medium. The computer readable medium may include a set of instructions for enabling a processor to obtain data records relating to one or more input variables and one or more output parameters associated with the product and to select one or more input parameters from the one or more input variables. The set of instructions may also enable the processor to generate a computational model indicative of interrelationships between the one or more input parameters and the one or more output parameters based on the data records and to provide a set of constraints to the computational model representative of a compliance state for the product. Further, the set of instructions may enable the processor to use the computational model and the provided set of constraints to generate statistical distributions for the one or more input parameters based on a symmetric random scatter process and the one or more output parameters. The one or more input parameters and the one or more output parameters may represent a design for the product.

Another aspect of the present disclosure includes a computer-based product design system. The design system may include a database containing data records relating one or more input variables and one or more output parameters associated with a product to be designed and a processor. The processor may be configured to obtain data records relating to one or more input variables and one or more output parameters associated with the product and to select one or more input parameters from the one or more input variables. The processor may also be configured to generate a computational model indicative of interrelationships between the one or more input parameters and the one or more output parameters based on the data records and to provide a set of constraints to the computational model representative of a compliance state for the product. Further, the processor may be configured to use the computational model and the provided set of constraints to generate statistical distributions for the one or more input parameters based on a symmetric random scatter process and the one or more output parameters. The one or more input parameters and the one or more output parameters represent a design for the product.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
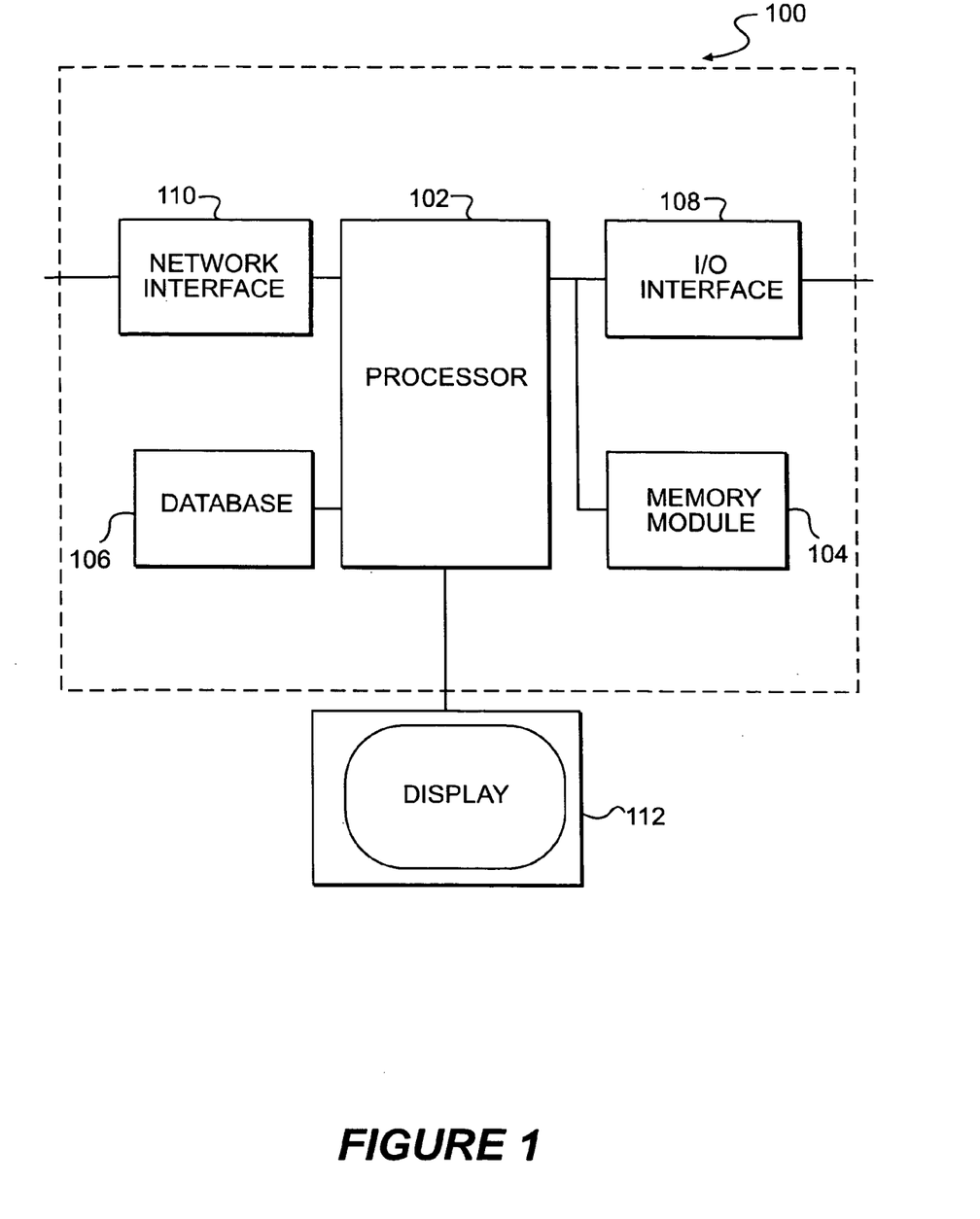
FIG. 1 is a block diagram representation of a product design system according to an exemplary disclosed embodiment.

FIG. 1 provides a block diagram representation of a product design system 100 for generating a design of a product. A product may refer to any entity that includes at least one part or component. A product may also refer to multiple parts assembled together to form an assembly. Non-limiting examples of products include work machines, engines, automobiles, aircraft, boats, appliances, electronics, and any sub-components, sub-assemblies, or parts thereof.

A product design may be represented as a set of one or more input parameter values. These parameters may correspond to dimensions, tolerances, moments of inertia, mass, material selections, or any other characteristic affecting one or more properties of the product. The disclosed product design system 100 may be configured to provide a probabilistic product design such that one or more input parameters can be expressed as nominal values and corresponding statistical distributions. Similarly, the product design may include nominal values for one or more output parameters and corresponding statistical distributions. The statistical distributions of the output parameters may provide an indication of the probability that the product design complies with a desired set of output requirements.

Product design system 100 may include a processor 102, a memory module 104, a database 106, an I/O interface 108, and a network interface 110. Product design system 100 may also include a display 112. Any other components suitable for receiving and interacting with data, executing instructions, communicating with one or more external workstations, displaying information, etc. may also be included in product design system 100.

Processor 102 may include any appropriate type of general purpose microprocessor, digital signal processor, or microcontroller. Memory module 104 may include one or more memory devices including, but not limited to, a ROM, a flash memory, a dynamic RAM, and a static RAM. Memory module 104 may be configured to store information accessed and used by processor 102. Database 106 may include any type of appropriate database containing information relating to characteristics of input parameters, output parameters, mathematical models, and/or any other control information. I/O interface 108 may be connected to various data input devices (e.g., keyboards, pointers, drawing tablets, etc.) (not shown) to provide data and control information to product design system 100. Network interface 110 may include any appropriate type of network adaptor capable of communicating with other computer systems based on one or more communication protocols. Display 112 may include any type of device (e.g., CRT monitors, LCD screens, etc.) capable of graphically depicting information.

Figure 2:
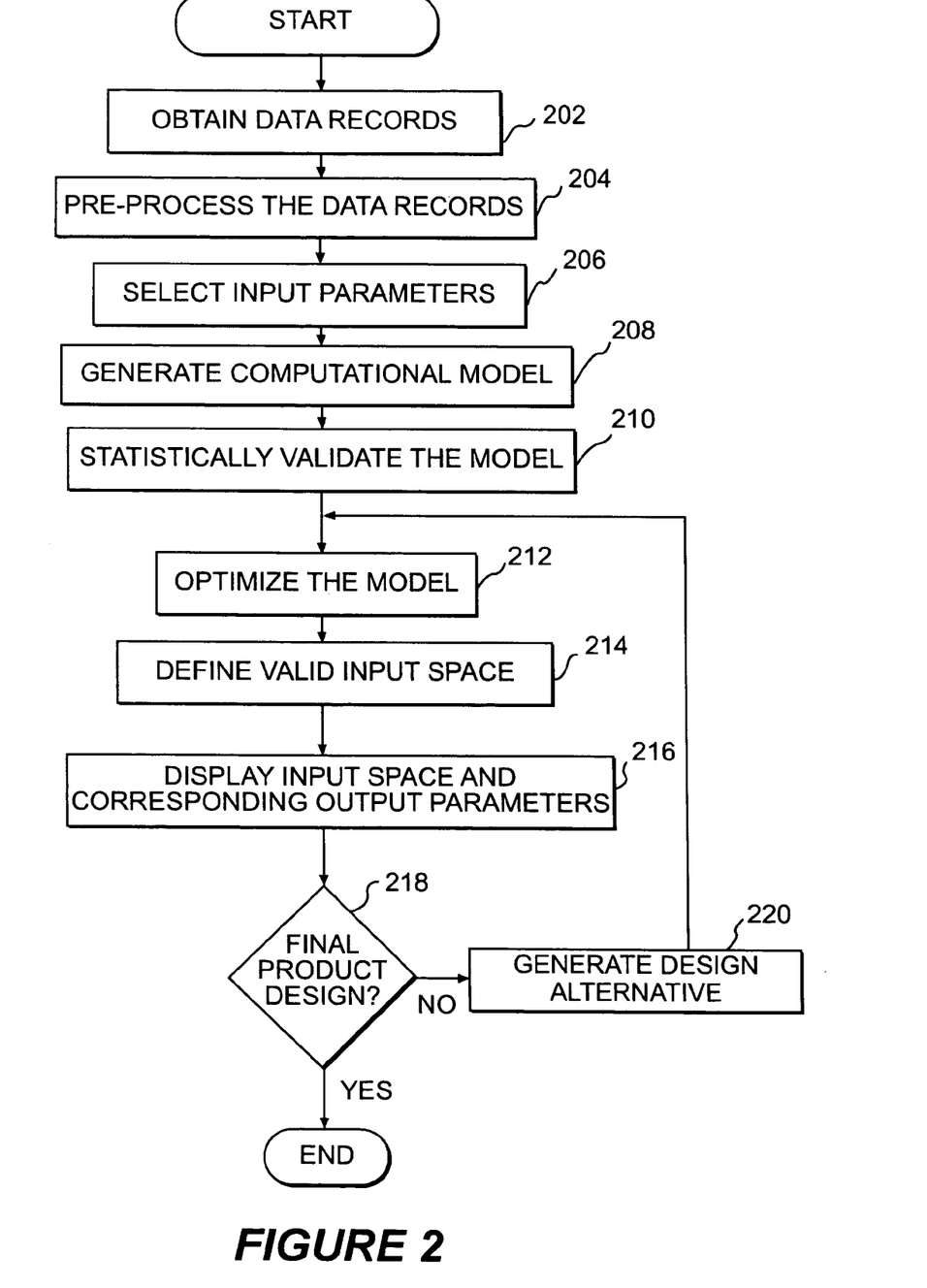
FIG. 2 is a flow chart representing an exemplary disclosed method for designing a product consistent with certain disclosed embodiments.

FIG. 2 provides a flow chart representing an exemplary disclosed method for designing a product using product design system 100. At step 202, product design system may obtain data records relating to input variables and output parameters associated with a product to be designed. The data records may reflect characteristics of the input parameters and output parameters, such as statistical distributions, normal ranges, and/or tolerances, etc. For each data record, there may be a set of output parameter values that corresponds to a particular set of input variable values. The data records may represent pre-generated data that has been stored, for example, in database 106. The data may be computer generated or empirically collected through testing of actual products.

In one embodiment, the data records may be generated in the following manner. For a particular product to be designed, a design space of interest may be identified. A plurality of sets of random values may be generated for various input variables that fall within the desired product design space. These sets of random values may be supplied to at least one simulation algorithm to generate values for one or more output parameters related to the input variables. The at least one simulation algorithm may be associated with, for example, systems for performing finite element analysis, computational fluid dynamics analysis, radio frequency simulation, electromagnetic field simulation, electrostatic discharge simulation, network propagation simulation, discrete event simulation, constraint-based network simulation, or any other appropriate type of dynamic simulation.

At step 204, which may be optional, the data records may be pre-processed. Processor 102 may pre-process the data records to clean up the data records for obvious errors and to eliminate redundancies. Processor 102 may remove approximately identical data records and/or remove data records that are out of a reasonable range in order to be meaningful for model generation and optimization. For randomly generated data records, any cases violating variable covariance terms may be eliminated. After the data records have been pre-processed, processor 102 may then select proper input parameters at step 206 by analyzing the data records.

The data records may include many input variables. In certain situations, for example, where the data records are obtained through experimental observations, the number of input variables may exceed the number of the data records and lead to sparse data scenarios. In these situations, the number of input variables may need to be reduced to create mathematical models within practical computational time limits and that contain enough degrees of freedom to map the relationship between inputs and outputs. In certain other situations, however, where the data records are computer generated using domain specific algorithms, there may be less of a risk that the number of input variables exceeds the number of data records. That is, in these situations, if the number of input variables exceeds the number of data records, more data records may be generated using the domain specific algorithms. Thus, for computer generated data records, the number of data records can be made to exceed, and often far exceed, the number of input variables. For these situations, the input parameters selected for use in step 206 may correspond to the entire set of input variables.

Where the number on input variables exceeds the number of data records, and it would not be practical or cost-effective to generate additional data records, processor 102 may select input parameters at step 206 according to predetermined criteria. For example, processor 102 may choose input parameters by experimentation and/or expert opinions. Alternatively, in certain embodiments, processor 102 may select input parameters based on a mahalanobis distance between a normal data set and an abnormal data set of the data records. The normal data set and abnormal data set may be defined by processor 102 by any suitable method. For example, the normal data set may include characteristic data associated with the input parameters that produce desired output parameters. On the other hand, the abnormal data set may include any characteristic data that may be out of tolerance or may need to be avoided. The normal data set and abnormal data set may be predefined by processor 102.

Mahalanobis distance may refer to a mathematical representation that may be used to measure data profiles based on correlations between parameters in a data set. Mahalanobis distance differs from Euclidean distance in that mahalanobis distance takes into account the correlations of the data set. Mahalanobis distance of a data set X (e.g., a multivariate vector) may be represented as $$MD_i = (X_i - \mu_x)\Sigma^{-1}(X_i - \mu_x)' \quad (1)$$

where $\mu_x$ is the mean of X and $\Sigma^{-1}$ is an inverse variance-covariance matrix of X. $MD_i$ weights the distance of a data point $X_1$ from its mean $\mu_x$ such that observations that are on the same multivariate normal density contour will have the same distance. Such observations may be used to identify and select correlated parameters from separate data groups having different variances.

Processor 102 may select a desired subset of input parameters such that the mahalanobis distance between the normal data set and the abnormal data set is maximized or optimized. A genetic algorithm may be used by processor 102 to search the input parameters for the desired subset with the purpose of maximizing the mahalanobis distance. Processor 102 may select a candidate subset of the input parameters based on a predetermined criteria and calculate a mahalanobis distance $MD_{normal}$ of the normal data set and a mahalanobis distance $MD_{abnormal}$ of the abnormal data set. Processor 102 may also calculate the mahalanobis distance between the normal data set and the abnormal data (i.e., the deviation of the mahalanobis distance $MD_x = MD_{normal} - MD_{abnormal}$). Other types of deviations, however, may also be used.

Processor 102 may select the candidate subset of the input parameters if the genetic algorithm converges (i.e., the genetic algorithm finds the maximized or optimized mahalanobis distance between the normal data set and the abnormal data set corresponding to the candidate subset). If the genetic algorithm does not converge, a different candidate subset of the input parameters may be created for further searching. This searching process may continue until the genetic algorithm converges and a desired subset of the input parameters is selected.

After selecting input parameters, processor 102 may generate a computational model to build interrelationships between the input parameters and output parameters (step 208). Any appropriate type of neural network may be used to build the computational model. The type of neural network models used may include back propagation, feed forward models, cascaded neural networks, and/or hybrid neural networks, etc. Particular types or structures of the neural network used may depend on particular applications. Other types of models, such as linear system or non-linear system models, etc., may also be used.

The neural network computational model may be trained by using selected data records. For example, the neural network computational model may include a relationship between output parameters (e.g., engine power, engine efficiency, engine vibration, etc.) and input parameters (e.g., cylinder wall thickness, cylinder wall material, cylinder bore, etc). The neural network computational model may be evaluated by predetermined criteria to determine whether the training is completed. The criteria may include desired ranges of accuracy, time, and/or number of training iterations, etc.

After the neural network has been trained (i.e., the computational model has initially been established based on the predetermined criteria), processor 102 may statistically validate the computational model (step 210). Statistical validation may refer to an analyzing process to compare outputs of the neural network computational model with actual outputs to determine the accuracy of the computational model. Part of the data records may be reserved for use in the validation process. Alternatively, processor 102 may generate simulation or test data for use in the validation process.

Once trained and validated, the computational model may be used to determine values of output parameters when provided with values of input parameters. Further, processor 102 may optimize the model by determining desired distributions of the input parameters based on relationships between the input parameters and desired distributions of the output parameters (step 212).

Processor 102 may analyze the relationships between distributions of the input parameters and desired distributions of the output parameters (e.g., design constraints provided to the model that may represent a state of compliance of the product design). Processor 102 may then run a simulation of the computational model to find statistical distributions for an individual input parameter. That is, processor 102 may separately determine a distribution (e.g., mean, standard variation, etc.) of the individual input parameter corresponding to the ranges of the output parameters representing a compliance state for the product. Processor 102 may then analyze and combine the desired distributions for all the individual input parameters to determined desired distributions and characteristics for the input parameters.

Alternatively, processor 102 may identify desired distributions of input parameters simultaneously to maximize the probability of obtaining desired outcomes (i.e., to maximize the probability that a certain product design is compliant with the desired requirements). In certain embodiments, processor 102 may simultaneously determine desired distributions of the input parameters based on zeta statistic. Zeta statistic may indicate a relationship between input parameters, their value ranges, and desired outcomes. Zeta statistic may be represented as $$\zeta = \sum_1^j \sum_1^i |S_{ij}| \left(\frac{\sigma_i}{\bar{x}_i}\right)\left(\frac{\bar{x}_j}{\sigma_j}\right),$$

where $\bar{x}_i$ represents the mean or expected value of an ith input; $\bar{x}_j$ represents the mean or expected value of a jth outcome; $\sigma_i$ represents the standard deviation of the ith input; $\sigma_j$ represents the standard deviation of the jth outcome; and $|S_{ij}|$ represents the partial derivative or sensitivity of the jth outcome to the ith input.

Processor 102 may identify a desired distribution of the input parameters such that the zeta statistic of the neural network computational model is maximized or optimized. A genetic algorithm may be used by processor 102 to search the desired distribution of input parameters with the purpose of maximizing the zeta statistic. Processor 102 may select a candidate set of input parameters with predetermined search ranges and run a simulation of the product design model to calculate the zeta statistic parameters based on the input parameters, the output parameters, and the neural network computational model. Processor 102 may obtain $\bar{x}_i$ and $\sigma_i$ by analyzing the candidate set of input parameters, and obtain $\bar{x}_j$ and $\sigma_j$ by analyzing the outcomes of the simulation. Further, processor 102 may obtain $|S_{ij}|$ from the trained neural network as an indication of the impact of ith input on the jth outcome.

Processor 102 may select the candidate set of values of input parameters if the genetic algorithm converges (i.e., the genetic algorithm finds the maximized or optimized zeta statistic of the product design model corresponding to the candidate set of input parameters). If the genetic algorithm does not converge, a different candidate set of values of input parameters may be created by the genetic algorithm for further searching. This searching process may continue until the genetic algorithm converges and a desired set of values of the input parameters is identified. Processor 102 may further determine desired distributions (e.g., mean and standard deviations) of input parameters based on the desired set of values of input parameters.

Figure 3:
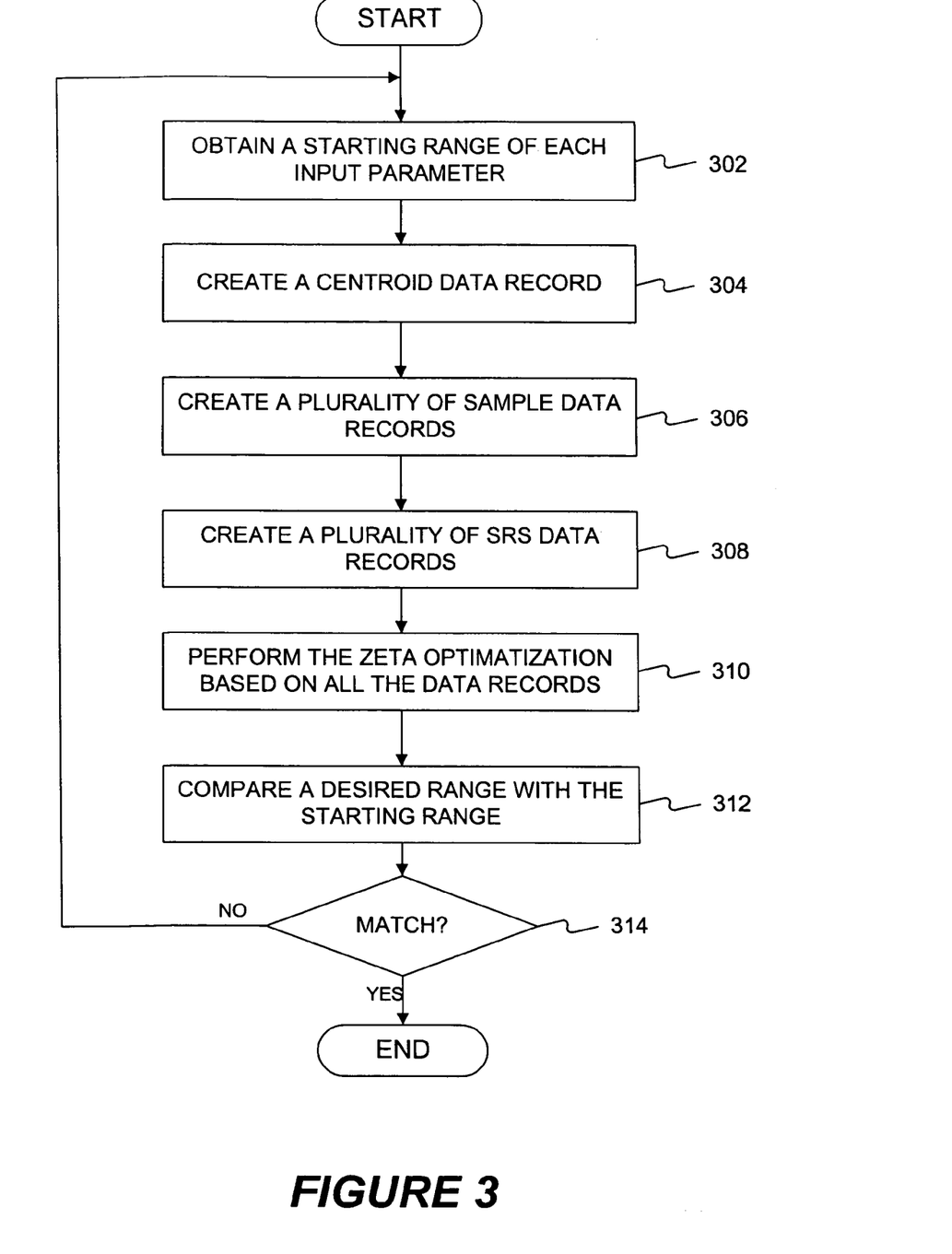
FIG. 3 illustrates a flowchart of an exemplary symmetric random scatter process consistent with certain disclosed embodiments.

In certain embodiments, processor 102 may perform a symmetric random scatter (SRS) process to decrease amount of time that processor 102 spends on the above searching process. A symmetric scatter, as used herein, may refer to a mathematical object resulted from a symmetric transformation of an original mathematic object. The original mathematic object may include any appropriate mathematical objects, such as polynomials, vectors, shapes, or discrete mathematical objects, etc. The symmetric transformation may include any appropriate type of mathematical operations, such as mirroring, geometrical transformation, or space/vector transformation, etc. A symmetric random scatter may refer to the symmetric scatter of a random original mathematical object. FIG. 3 illustrates an exemplary SRS process performed by processor 102.

As shown in FIG. 3, at the beginning of the SRS process, processor 102 may obtain a starting range for each of the input parameters (step 302). Processor 102 may obtain the starting range by analyzing the select data records of the input parameters. The processor 102 may also obtain the starting range from other applications or processes associated with the input parameters. After the starting range for each of the input parameters are obtained (step 302), processor 102 may create a centroid data record of the input parameters (step 304). The centroid data record may be a mean of the input parameters. The mean may include any appropriate mathematical mean of the input parameters, such as statistical mean, or geometric mean, etc. For example, the centroid data record may include a midpoint of each of the input parameters. Other types of means, however, may also be used.

The starting range of each input parameters may define a input space (i.e., all ranges or possible values of the input parameters), the centroid data record may then be referred to as a center of the input space. After the centroid data record is created (step 304), processor 102 may create a plurality of sample data records within the starting range (step 306). The sample data records may include any data record having a value for each input parameter from the starting range. Processor 102 may create the sample data records in various ways. In certain embodiments, the sample records may be created randomly by processor 102. The total number of the sample data records may be predetermined base on a particular application. For example, a total of approximately 10 sample data records may be created for the applications described in this disclosure. Other numbers of sample data records, however, may also be used.

Further, processor 102 may create a corresponding plurality of SRS data records (step 308). To create the SRS data records, processor 102 may calculate a SRS for each sample data record. That is, each sample data record may be an original mathematic object and the SRS of each sample data record may be a symmetric vector opposite of each original mathematic object (e.g., a vector) with respect to the centroid data record (e.g., the center of the input space). For example, an original two-dimensional vector (1,1) may have a symmetric scatter of (−1, −1) with respect to a centroid of (0, 0). Because the SRS data records may be symmetric scatters of the sample data records, the combination of the SRS data records, the sample data records, and the centroid data record may reflect a random part of the starting range centered at the mean of the input parameters.

After creating the plurality of SRS data records, processor 102 may use the SRS data records, the sample data records, and the centroid data record as the selected data records to perform the zeta statistic optimization as describe above (step 310). Processor 102 may also generate a desired distribution or desired range of the input parameters from the zeta statistic optimization. Further, processor 102 may compare the starting range of the input parameters with the desired range of the input parameters (step 312).

Processor 102 may determine whether the starting range matches with the desired range (step 314). The criteria for determining whether or not the two ranges match may be different depending on the particular application. For example, processor 102 may determine a match if the two ranges match each other exactly. Or processor 102 may determine a match if the two ranges match each other within a predetermined error margin. Further, processor 102 may determine a match if the desired range covers the starting range, or the starting range covers the desired range, within a predetermined error margin. Other types of matching, however, may also be used.

If processor 102 determines that the desired range matches the starting range (step 314; yes), processor 102 may complete the SRS process and continue with the designing process. On the other hand, if processor 102 determines that the desired range does not match the starting range (step 314; no), processor 102 may use the desired range as the starting range in step 302 and continue the SRS process until the two ranges match or until a predetermined time period expires.

Returning to FIG. 2, after the product design model has been optimized (step 212), processor 102 may define a valid input space (step 214) representative of an optimized design of the product. This valid input space may represent the nominal values and corresponding statistical distributions for each of the selected input parameters. To implement the design of the product, values for the input parameters selected within the valid input space would maximize the probability of achieving a compliance state according to the constraints provided to the model.

Once the valid input space has been determined, this information may be provided to display 112. Along with the input space information, the nominal values of the corresponding output parameters and the associated distributions may also be supplied to display 112. Displaying this information conveys to the product design engineer the ranges of values for the selected input parameters that are consistent with the optimized product design. This information also enables the engineer to determine the probability of compliance of any one of or all of the output parameters in the optimized product design.

While the processor 102 may be configured to provide an optimized product design based on the interrelationships between the selected input parameters and the output parameters and on the selected output constraints, the model allows for additional input by the product design engineer. Specifically, at step 218, the engineer is allowed to determine if the optimized product design generated by processor 102 represents the desired final design. If the answer is yes (step 218, yes), then the process ends. If the answer is no (step 218, no) the engineer can generate a design alternative (step 220).

To generate a design alternative, the engineer can vary any of the values of the input parameters or the distributions associated with the input parameters. The changed values may be supplied back to the simulation portion of the model for re-optimization. Based on the changed values, the model will display updated values and distributions for the output parameters changed as a result of the change to the input parameters. From the updated information, the engineer can determine how the alternative product design impacts the probability of compliance. This process can continue until the engineer decides on a final product design. It should be noted that alternative designs may also be generated by varying the values or distributions for the output parameters or by defining different or additional product design constraints.

Display 112 may also be used to display statistical information relating to the performance of the product design model. For example, distributions for the input parameters and the output parameters may be calculated based on the original data records. These distributions may represent an actual statistical space that can be compared with a predicted statistical space generated by the model. Overlap of the actual statistical space with the predicted statistical space may indicate that the model is functioning as expected.

INDUSTRIAL APPLICABILITY

The disclosed systems and methods may efficiently provide optimized product designs for any type of product that can be modeled by computer. Based on the disclosed system, complex interrelationships may be analyzed during the generation of computational models to optimize the models by identifying distributions of input parameters to the models to obtain desired outputs. The robustness and accuracy of product designs may be significantly improved by using the disclosed systems and methods.

The efficiency of designing a product may also be improved using the disclosed systems and methods. For example, the disclosed zeta statistic approach yields knowledge of how variation in the input parameters translates to variation in the output parameters. Thus, by defining the interrelationships between the input parameters and the output parameters in a system, the disclosed product design system can operate based on a proxy concept. That is, because these interrelationships are known and modeled, there is no need to use domain specific algorithm tools each time the model wishes to explore the effects of a variation in value or distribution of an input parameter or output parameter. Thus, unlike traditional systems that must pass repeatedly pass through slow simulations as part of a design optimization process, the disclosed modeling system takes advantage of well-validated models (e.g., neural network models) in place of slow simulations to more rapidly determine an optimized product design solution.

The disclosed product design system can significantly reduce the cost to manufacture a product. Based on the statistical output generated by the model, the model can indicate the ranges of input parameter values that can be used to achieve a compliance state. The product design engineer can exploit this information to vary certain input parameter values without significantly affecting the compliance state of the product design. That is, the manufacturing constraints for a particular product design may be made less restrictive without affecting (or at least significantly affecting) the overall compliance state of the design. Relaxing the manufacturing design constraints can simplify the manufacturing process for the product, which can lead to manufacturing cost savings.

The disclosed product design system can also enable a product design engineer to explore "what if" scenarios based on the optimized model. Because the interrelationships between input parameters and output parameters are known and understood by the model, the product designer can generate alternative designs based on the optimized product design to determine how one or more individual changes will affect the probability of compliance. While these design alternatives may move away from the optimized product design solution, this feature of the product design system can enable a product designer to adjust the design based on experience. Specifically, the product designer may recognize areas in the optimized model where certain manufacturing constraints may be relaxed to provide a cost savings, for example. By exploring the effect of the alternative design on product compliance probability, the designer can determine whether the potential cost savings of the alternative design would outweigh a potential reduction in probability of compliance.

The disclosed product design system can also a design engineer to collect a pattern of design candidates that gives an improved probability of modeling the design space in a minimum number of simulation or data collection operations based on the symmetric random scatter (SRS) process. The SRS process may also be combined with other modeling or design applications to significantly reduce the order of design iterations.

The disclosed product design system has several other advantages. For example, the use of genetic algorithms at various stages in the model avoids the need for a product designer to define the step size for variable changes. Further, the model has no limit to the number of dimensions that can be simultaneously optimized and searched.

Other embodiments, features, aspects, and principles of the disclosed exemplary systems will be apparent to those skilled in the art and may be implemented in various environments and systems.

What is claimed is:

1. A method for designing a product performed by a processor associated with a computer and comprising the steps of:
    obtaining data records relating to one or more input variables and one or more output parameters of a configuration of the product;
    selecting one or more input parameters from the one or more input variables;
    generating a computational model for the product configuration, the computational model indicative of interrelationships between the one or more input parameters and the one or more output parameters based on the data records;
    providing a set of constraints to the computational model representative of a compliance state for the product;
    using the computational model and the provided set of constraints to generate statistical distributions for the one or more input parameters based on a symmetric random scatter process and the one or more output parameters, the symmetric random scatter process including:
        obtaining initial ranges of the input parameters;
        creating a plurality of model data records including at least one symmetric model data record based on the initial ranges of the input parameters;
        determining a candidate set of values of the input parameters based on the plurality of model data records; and
        determining the statistical distributions of the one or more input parameters based on the candidate set; and
    identifying a desired range of input parameters for the product configuration based on the generated statistical distributions for the one or more input parameters.

2. The method of claim 1, further including using the computation model to generate nominal values for the one or more input parameters and the one or more output parameters.

3. The method of claim 2, further including modifying the design for the product by adjusting at least one of the statistical distributions and the nominal values for any of the one or more input parameters and the one or more output parameters.

4. The method of claim 1, wherein the symmetric random scatter process further includes:
    determining the candidate set of values of the input parameters based further on maximizing a zeta statistic using a genetic algorithm, wherein the zeta statistic $\zeta$ is represented by:

$$\zeta = \sum_{1}^{j} \sum_{1}^{i} |S_{ij}| \left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

5. The method of claim 4, wherein the creating further includes:
    creating a centroid data record corresponding to midpoint values of the initial ranges of the input parameters;
    randomly creating a plurality of sample data records of the input parameters within the initial ranges of the input parameters;
    creating a plurality of respective symmetric random scatter data records of the plurality of sample data records as symmetric scatter of the plurality of sample data records with respect to the centroid data record; and
    creating the plurality of data records by combining the centroid data record, the sample data records, and the symmetric random scatter data records.

6. The method of claim 4, further including:
    comparing the statistical distributions of the input parameters with the initial ranges of input parameters; and
    determining whether the statistical distributions of the input parameters match the initial ranges of input parameters.

7. The method of claim 6, further including:
    if the statistical distributions of the input parameters do not match the initial ranges of the input parameters, changing the initial ranges of the input parameters to the same as the statistical distributions of the input parameters; and
    re-determining the statistical distributions of the input parameters based on the changed initial ranges until the statistical distributions of the input parameters match the respective range of the input parameters.

8. The method of claim 7, further including graphically displaying on a display:
    the statistical distribution for the one or more input parameters and the one or more output parameters; and
    nominal values for the one or more input parameters and the one or more output parameters.

9. The method of claim 8, further including graphically displaying on the display:
    statistical information for the one or more input parameters and the one or more output parameters obtained based on the data records.

10. A computer readable storage medium storing a set of instructions for enabling a processor associated with a computer to:
    obtain data records relating to one or more input variables and one or more output parameters associated with a configuration of a product to be designed;
    select one or more input parameters from the one or more input variables;
    generate a computational model for the product configuration, the computational model indicative of interrelationships between the one or more input parameters and the one or more output parameters based on the data records;
    provide a set of constraints to the computational model representative of a compliance state for the product;
    use the computational model and the provided set of constraints to generate statistical distributions for the one or more input parameters based on a symmetric random scatter process and the one or more output parameters, the symmetric random scatter process including:
        obtaining initial ranges of the input parameters;
        creating a plurality of model data records including at least one symmetric model data record based on the initial ranges of the input parameters;
        determining a candidate set of values of the input parameters based on the plurality of model data records; and determining the statistical distributions of the one or more input parameters based on the candidate set; and identifying a desired range of input parameters for the product configuration based on the generated statistical distributions for the one or more input parameters.

11. The computer readable storage medium of claim 10, wherein the symmetric random scatter process further includes:

determining the candidate set of values of input parameters based further on maximizing a zeta statistic using a genetic algorithm, wherein the zeta statistic ζ is represented by:

$$\zeta = \sum_{1}^{j}\sum_{1}^{i}|S_{ij}|\left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ a standard deviation of the jth output; and $|S_{ij}|$ represents sensitivity of the jth output to the ith input of the computational model.

12. The computer readable storage medium of claim 11, further storing instructions for enabling the processor to:

create a centroid data record corresponding to midpoint values of the initial ranges of the input parameters;

randomly create a plurality of sample data records of the input parameters within the initial ranges of the input parameters;

create a plurality of respective symmetric random scatter data records of the plurality of sample data records as symmetric scatter of the plurality of sample data records with respect to the centroid data record; and create the plurality of data records by combining the centroid data record, the sample data records, and the symmetric random scatter data records.

13. The computer readable storage medium of claim 11 further storing instructions for enabling the processor to:

compare the statistical distributions of the input parameters with the initial ranges of input parameters; and determine whether the statistical distribution of the input parameters match the initial ranges of input parameters.

14. The computer readable storage medium of claim 11 further storing instructions for enabling the processor to graphically display:

the statistical distributions for the one or more input parameters and the one or more output parameters; and nominal values for the one or more input parameters and the one or more output parameters.

15. The computer readable storage medium of claim 14, further including instructions for enabling the processor to graphically display:

statistical information for the one or more input parameters and the one or more output parameters obtained based on the data records.

16. A computer-based product design system, comprising:

a database containing data records relating one or more input variables and one or more output parameters associated with a product to be designed; and a processor configured to:

obtain data records relating to one or more input variables and one or more output parameters associated with a configuration of the product;

select one or more input parameters from the one or more input variables;

generate a computational model for the product configuration, the computation model indicative of interrelationships between the one or more input parameters and the one or more output parameters based on the data records;

provide a set of constraints to the computational model representative of a compliance state for the product;

use the computational model and the provided set of constraints to generate statistical distribution for the one or more input parameters based on a symmetric random scatter process and the one or more input parameters, the symmetric random scatter process including:

obtaining initial ranges of the input parameters;

creating a plurality of model data records including at least one symmetric model data record based on the initial ranges of the input parameters;

determining a candidate set of values of the input parameters based on the plurality of model data records; and determining the statistical distributions of the one or more input parameters based on the candidate set; and identify a desired range of input parameters for the product configuration based on the generated statistical distributions for the one or more input parameters.

17. The computer-based product design system of claim 16, wherein the symmetric random scatter process further includes:

determining the candidate set of values of input parameters based further on maximizing a zeta statistic using a genetic algorithm, wherein the zeta statistic ζ is represented by:

$$\zeta = \sum_{1}^{j}\sum_{1}^{i}|S_{ij}|\left(\frac{\sigma_i}{\bar{x}_i}\right)\left(\frac{\bar{x}_j}{\sigma_j}\right),$$

provided that $\bar{x}_i$ represents a mean of an ith input; $\bar{x}j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

18. The computer-based product design system of claim 17, wherein to use the computational model to generate statistical distributions, the processor is further configured to:

create a centroid data record corresponding to midpoint values of the initial ranges of the input parameters;

randomly create a plurality of sample data records of the input parameters within the initial ranges of the input parameters;

create a plurality of respective symmetric random scatter data records of the plurality of sample data records as symmetric scatter of the plurality of sample data records with respect to the centroid data record; and create the plurality of data records by combining the centroid data record, the sample data records, and the symmetric random scatter data records.

19. The computer-based product design system of claim 16, further including:

a display;

wherein the processor is configured to display the statistical distributions for the one or more input parameters and the one or more output parameters; and nominal values for the one or more input parameters and the one or more output parameters.

20. The computer-based product design system of claim 19, wherein the processor is configured to display statistical information for the one or more input parameters and the one or more output parameters obtained based on the data records.

* * * * *